US 6,739,746 B1

(12) United States Patent
Tang

(10) Patent No.: US 6,739,746 B1
(45) Date of Patent: May 25, 2004

(54) WATER RESISTANT DEVICE FOR BASE OF FIBER-OPTIC CHRISTMAS TREE

(76) Inventor: Tai-Ning Tang, 581 Kamoku St. #3506, Honolulu, HI (US) 96826

( * ) Notice: Subject to any disclaimer, the term of this patent is extended or adjusted under 35 U.S.C. 154(b) by 0 days.

(21) Appl. No.: 10/404,424

(22) Filed: Apr. 2, 2003

(51) Int. Cl.[7] ............................................ F47G 33/12
(52) U.S. Cl. ...................... 362/568; 362/564; 362/567; 362/122; 362/806
(58) Field of Search .................. 362/564, 567, 362/568, 554, 556, 583, 581, 580, 457, 458, 806, 252, 122, 123, 805; 428/18, 542.2; 40/433, 547; 248/519, 523

(56) References Cited

U.S. PATENT DOCUMENTS

| 3,766,376 A | * | 10/1973 | Sadacca et al. ............... 40/433 |
| 4,060,722 A | * | 11/1977 | Foley ............................ 362/568 |
| 4,858,086 A | * | 8/1989 | Pietrantonio et al. ......... 362/123 |
| 5,104,608 A | * | 4/1992 | Pickering ...................... 362/568 |
| 5,420,765 A | * | 5/1995 | Nordeen et al. ............... 362/96 |
| 6,017,142 A | * | 1/2000 | Harris, Jr. .................... 362/564 |
| 6,382,582 B1 | * | 5/2002 | Brown ........................... 248/521 |
| 6,648,497 B2 | * | 11/2003 | Puleo, Sr. ..................... 362/568 |
| 6,672,750 B1 | * | 1/2004 | Kao ............................. 362/567 |

* cited by examiner

Primary Examiner—Sandra O'Shea
Assistant Examiner—Hargobind S. Sawhney
(74) Attorney, Agent, or Firm—Rabin & Berdo, P.C.

(57) ABSTRACT

A water-resistant base device for optical-fiber Christmas trees, consisting of a main base unit, a upper base cover, a rotating unit, a fixing unit, a water-resistant hood, a top cover and a tree unit. The rotating unit is installed on the fixing unit structure on the upper cover of the base, using a ringed wall protruding from the top periphery of the main base unit, the water-resistant hood fastened onto the top of the upper base cover, and the arched top cover covering the top of the water-resistant hood, to enable heat radiation and water resistant functions to the entire base assembly, so the Christmas tree can be installed for indoor and outdoor purposes.

1 Claim, 3 Drawing Sheets

WATER RESISTANT DEVICE FOR BASE OF FIBER-OPTIC CHRISTMAS TREE

BACKGROUND OF THE INVENTION (a) Field of the Invention

The present invention relates to a water resistant device for the base of fiber-optic Christmas tree, particularly to one enabling insertion by a Christmas tree made with optical fibers, using an interior light-emitting device and a transmission structure, driving the Christmas tree to rotate slowly, emitting multiple and varying colors and patterns of light through the terminal ends at the top of the fiber-optic Christmas tree, demonstrating a structural design of a base unit with a water resistant mechanism; it comprises mainly a main base unit, a upper base cover, a rotating unit, a fixing unit, a water resistant hood, a top cover and a tree unit, wherein, protruding from the top rim of the main base unit is a ringed wall, installed at the bottom inside the rotating unit is a transparent bottom plate, the fixing unit can be covered and tightened onto the upper base cover, to fasten the rotating unit. The water resistant hood is shaped like a reversed hopper, serving to cover the top of the upper base cover, the top cover is mounted at the top of the water resistant hood. The tree unit is accommodated inside the rotating unit, serving to insert and fasten the fiber-optic Christmas tree. Such a structure will be able to achieve heat radiation and water resistance, so the Christmas tree can be secured for indoor or outdoor applications, thereby effectively enhancing its flexible uses and efficiency.

(b) Description of the Prior Art

The development of fiber-optic Christmas trees has been changed from traditional static status with simple colors of lighting to modern-day fiber-optic Christmas trees that can be rotated, and have multiple colors and changing patterns of lighting effects transmitted out of the terminals at the top of the fiber-optic Christmas tree. When displayed at festivals and holiday celebrations, the fiber-optic Christmas tree can bring much fun and better atmosphere. The popularly used fiber-optic Christmas tree has a base to accommodate the Christmas tree, which is generally consisted of a main base unit and an upper base cover. Installed at the top of the main base unit is a transmission device consisting of a motor, a speed reducing gear set, a color disc and a lamp bulb. Installed at the center of on top of the upper base cover is a rotating unit, using a fixing unit to cover and fasten it. The fiber-optic Christmas tree is fastened onto the rotating unit. When the light-emitting transmission device in the main base unit is activated, the motor drives the color disc to rotate slowly through the speed reducing gear set, the light of the bulb project colors through the color disc (having semi-transparent patterned blocks in various colors) into the base of the fiber-optic Christmas tree, the changing colors and patterns then come out of the terminal ends at the top of the tree, on the other hand, the transmission gear fixed at the top of the color disc drives the rotating unit in mesh to rotate, so the entire Christmas tree fastened on the rotating unit creates an elegant appearance of slow rotation. However, since high heat is generated in the use of the light-emitting transmission device. For the sake of safety and longer working life, the upper base cover is generally equipped with a plurality of heat radiating groove holes, allowing air to flow through the inside of the base unit, to radiate high heat effectively out of the light-emitting transmission device. However, due to the design of such radiating groove holes, conventional fiber-optic Christmas trees can only be used inside a building. When it is laid outdoors and subjected to rain or invaded by water (also applicable to indoor use), the inside light-emitting transmission device will be short-circuited or burned, which result in high risks and narrowed range of applications (only applicable for indoor use).

In view of those disadvantages, the inventor has devoted in research, based on many years of experience in the research, development and production of related products and peripherals, and after repeated conceptions, test productions, tests and revisions, has finally come up with the present invention of water resistant device for the base of fiber-optic Christmas tree, providing a light-emitting transmission device to enhance safety, enable indoor and outdoor use, enhance variable applications and efficiency.

BRIEF DESCRIPTION OF THE INVENTION

To enable better understanding of the structural characteristics and physical performance of the present invention, please refer to the drawings of preferred embodiments.

BRIEF DESCRIPTION OF NUMERALS

| | | | |
|---|---|---|---|
| 10 | main base unit | 28 | track groove |
| 11 | transmission device | 30 | rotating unit |
| 12 | color disc | 31 | outside gear |
| 13 | transmission gear | 32 | base plate |
| 14 | lamp bulb | 40 | fixing unit |
| 15 | fixing post | 41 | protruding ear |
| 16 | screw hole | 42 | through hole |
| 17 | recess groove | 50 | water-resistant hood |
| 18 | ringed wall | 51 | supporting post |
| 20 | upper base cover | 60 | top cover |
| 21 | radiating groove hole | 61 | ringed groove |
| 22 | through hole | 70 | tree unit |
| 23 | roller | 80 | support leg |
| 24 | sunk hole | 81 | screw |
| 25 | through hole | 82 | screw |
| 26 | recess hole | 90 | optic-fiber Christmas tree |
| 27 | screw hole | | |

DETAILED DESCRIPTION OF PREFERRED EMBODIMENTS

For your better understanding of the structural characteristics and physical performance of the present invention, please refer to the drawings of preferred embodiment.

Figure 1:
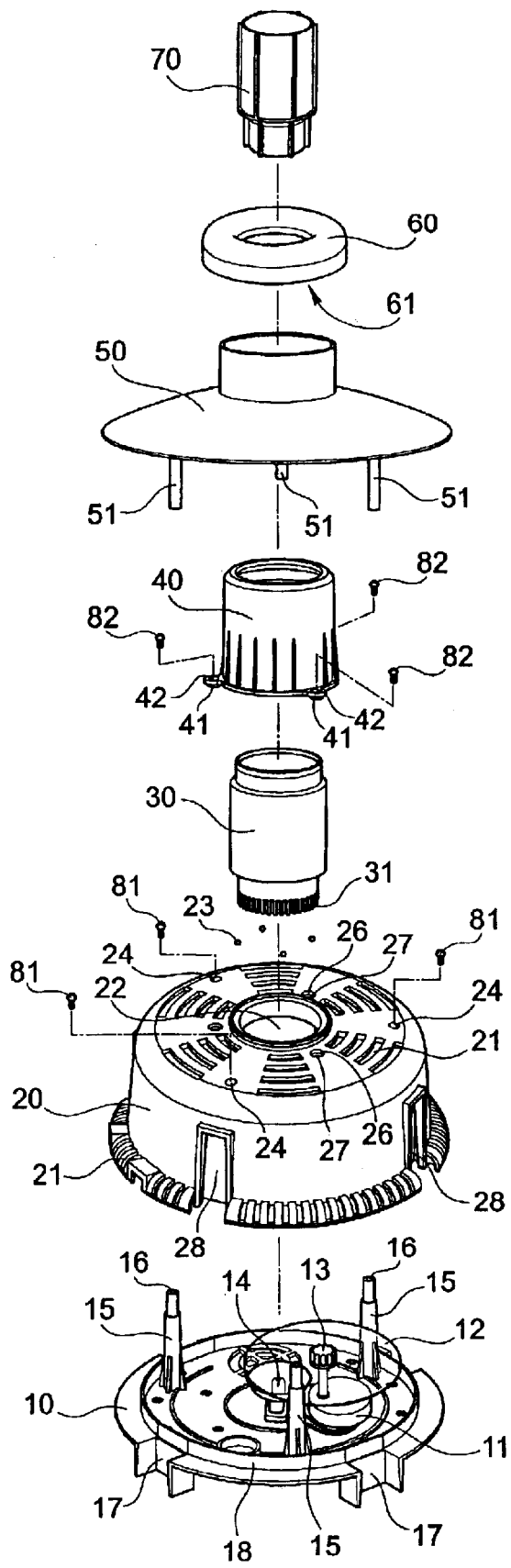
FIG. 1 is an exploded view of the present invention.
Figure 2:
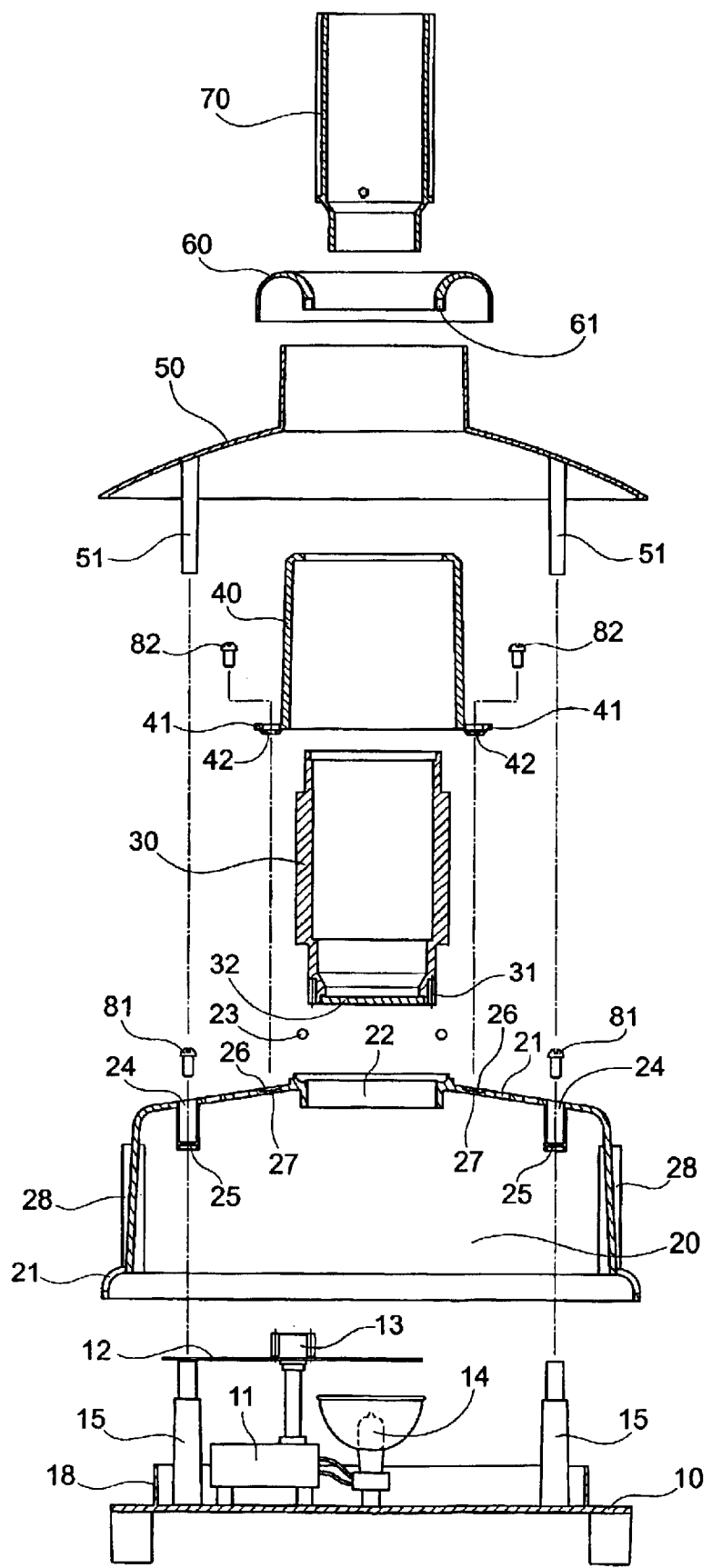
FIG. 2 is a schematic view of the exploded view of the invention.

As shown in FIGS. 1 and 2, the present invention comprises a main base unit 10, a upper base cover 20, a rotating unit 30, a fixing unit 40, a water-resistant hood 50, a top cover 60 and a tree unit 70. On the top of the main base unit 10 is installed a light-emitting transmission device comprising a transmission device 11 (containing a motor and a reducing gear set), a color disc 12, a transmission gear 13 and a lamp bulb 14. The top of the base unit 10 is ringed with a plurality of fixing posts 15. At the center of the top of the post is a screw hole 16. On the outside periphery of the post 15 are a plurality of recess grooves 17 that are equally spaced. On the bottom edge and top edge of the upper base cover 20 is a plurality of heat radiating groove holes 21. At the center of the cover of the cover is a through hole 22. In the ring groove on the rim of the hole top are a plurality of rollers. On the outer rim of the cover unit and corresponding to each fixing post 15 of the main base unit 10 is a sunk hole 24. On the bottom of the hole is a through hole 25. On the cover unit near the rim of the through hole 22 is a plurality of recess holes 26. At the center of the hole 26 is a screw hole 27. on the side rim of the cover unit corresponding to the recess groove 17 of the main base unit 10 is a track groove 28 to accommodate the fixing of a support leg 80. The rotating unit 30 is a hollow tube that can be inserted into the through hole 22 on the upper base cover 20. Surrounding the bottom rim of the base unit is an outside gear 31, that is in mesh with and driven by the transmission gear 13 installed on the light-emitting transmission device inside the main base unit 10.

The present invention is characterized in that:

At the outside rim on the top of the main base unit 10 is a protrusion of a ringed wall 18;

In addition to the outside gear 31 on the bottom rim of the rotating unit 30, as described above, the rotating unit 30 has a transparent bottom plate 32 that is fixed to the bottom rim of the through hole inside, so the base unit becomes a non-through cup structure.

The fixing unit 40 is a hollow tube, at its bottom rim corresponding to each recess hole 26 of the upper base cover 20 is respectively a protruding ear 41, on each protruding ear 41 is a through hole 42 to match the screw hole 27 of the recess hole 26.

The water-resistant hood 50 is shaped like a reversed hopper, having an outside diameter slightly larger than the outside diameter of the cover unit of the upper base cover 20. On the bottom of the hood unit corresponding to each sunk hole 24 on the upper base cover 20 is a vertical and downward formation of a protruded support post 51.

The top cover 60 is shaped like a ring having a reversed-U section, on the bottom of the inside rim of the hole is a ringed groove 61 having a bore to match the top opening of the rotating unit 30.

The tree unit 70 is shaped like a hollow cylinder, having a lower section with a slightly tapered bore, which can be accommodated inside the rotating unit 30.

Figure 3:
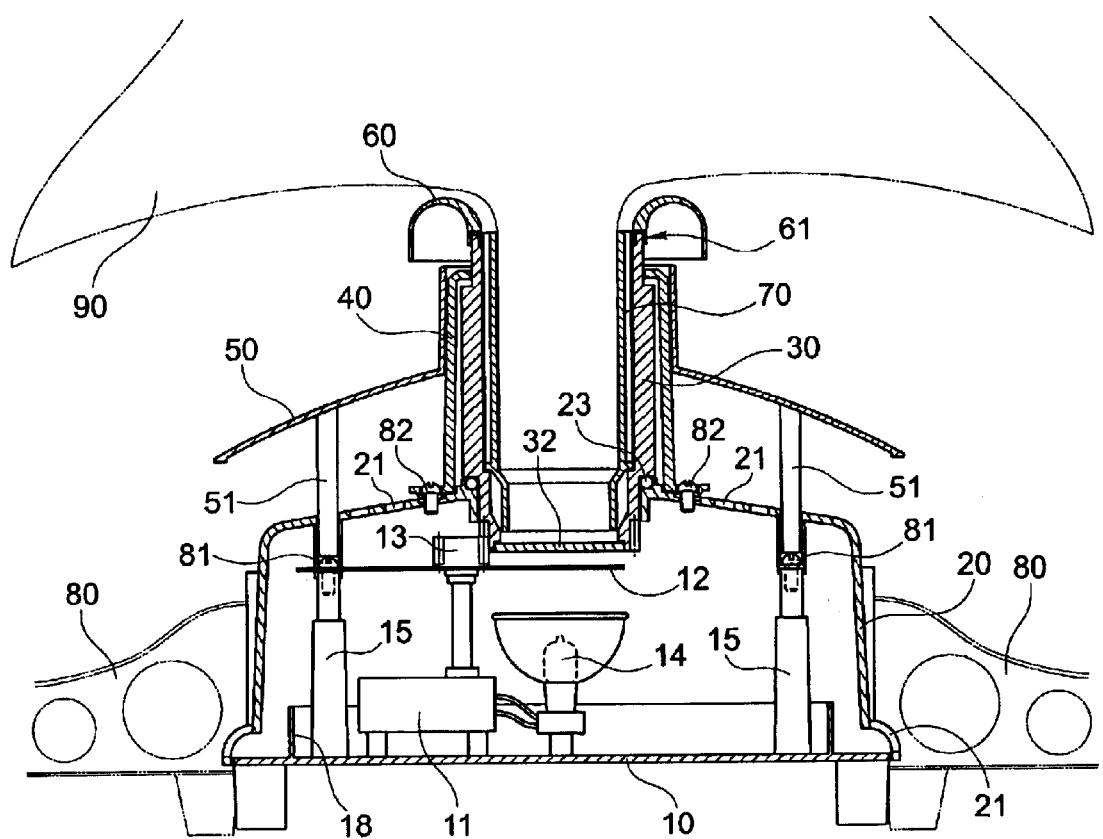
FIG. 3 is a section view of the assembly of the invention.

In the above assembly, as shown in FIG. 3, the upper base cover 20 is covered on top of the main base unit 10, using a screw 81 penetrating through the through hole 25 in the sunk hole 24, fastening the fixing post 15 of the main base unit 10 into the screw hole 16, so the two parts are tightly assembled. Then, the rotating unit 30 is inserted into the through hole 22 on the upper base cover 20, so the outside gear 31 on the bottom rim is in mesh with the transmission gear 13 of the inside light-emitting transmission device. Then, the fixing unit 40 is mounted outside the rotating unit 30, and the protruding ear 41 is aligned with the recess hole 26 on the upper base cover 20, using the screw 82 to penetrate through the through hole 42 of the protruding ear 41 and into the screw hole 27 at the center of the recess hole 26. Then the fixing unit 40 and the rotating unit 30 are mounted onto the upper base cover 20. Then the water resistant hood 50 with its central hole is mounted outside the fixing unit 40, having each post 51 at its bottom inserted into each sunk hole 24 of the upper base cover 20, so the water resistant hood 50 is fastened onto the upper base cover 20. Then, the ringed groove 61 at the bottom rim of the top cover 60 is embedded and fixed to the opening at the top rim of the rotating unit 30. Finally, the tree unit 70 is directly accommodated inside the rotating unit 30, and the assembly is assembled. To enable better fastening purpose for the entire base, the recess groove 17 on the main base unit 10 and the track groove 28 on the upper base cover 20 serve to enable better fixing of the support leg 80; the fiber-optical Christmas tree 90 can be inserted and fastened inside the tree unit 70.

In such a structure, inside the heat radiating groove hole 21 on the bottom rim of the upper base cover 20, since the main base unit 10 has a ringed wall 18, it could prevent outside water from seeping into the base through the radiating groove hole 21 at the bottom. On the top of the upper base cover 20 is a protection provided by the water resistant hood 50, so water on the outside will not seep into the base through the radiating groove hole 21 on the top of the cover unit, which will effectively achieve the performance of water resistance. Since the inside bottom of the rotating unit 30 is sealed (having a base plate 32), water will not seep into the base. In case of rain causing water accumulation inside the rotating unit 30 (or the tree unit 70), the overflowing water can be guided out smoothly through the arched top cover 60, out of the range of the base along the water resistant hood 50, without harming the electronic or mechanical components inside the base. An important feature is that, since there is a proper distance between the ringed wall 18 and the water resistant hood 50 and the radiating groove hole 21 above and under the upper base cover 20, convective air can flow in and out freely without any obstruction, enabling excellent heat radiation to the present invention.

Summing up, the present invention has sophisticated structural design for effective improvement on existing weaknesses of conventional fiber-optic Christmas tree base without a water resistant mechanism, achieving multiple purposes of excellent heat radiation and excellent resistance to water, sufficiently protecting the safety of use of interior components, for better safety and applicability for either indoor or outdoor purposes. Compared with similar products available on the market, the present invention has its inventive step, improvement and applicability. Therefore this application is filed for a patent right. Your favorable consideration shall be appreciated.

What is claimed is:

1. A water resistant device for the base Of the fiber-optic Christmas tree, comprising a main base unit, an upper base cover, a rotating unit, a fixing unit, a water resistant hood, a top cover and a tree unit, wherein, the on top of the main base unit is installed a light-emitting transmission device comprising a transmission device, a color disc, a transmission gear and a lamp bulb, surrounding a top of the main base unit being a plurality of fixing posts, at the center of the top of the post being a screw hole, surrounding it's rim being a specified number of recess grooves that are equally spaced, the upper cover having a plurality heat radiating grove holes on its bottom rim and top rim, at the center of the cover top being a through hole, inside the ringed groove on the rim of the hole top being a plurality of rollers, on the outside of cover unit and corresponding to each fixing post on the main base unit being a sunk hole, the bottom of the hole having a through hole, on the cover unit and close to the rim of the through hole being a plurality of recess holes, at the center of the hole being a screw hole, on the side of the cover unit and corresponding to the recess groove on the main base unit being a track groove to engage with the support leg; the rotating unit being a hollow tube that can be installed inside the through hole on the upper base cover, on the bottom rim of the base unit being an outside gear in mesh with and driven by the transmission gear on the light-emitting transmission device inside the main base unit; characterized in that:

at the outside rim on top of the base unit of the main base unit being a ringed wall;

at the outside rim on top of the base unit of the main base unit being a ringed wall;

in addition to an outside gear on its bottom rim, the rotating unit has a transparent bottom plate that is fixed onto the base of its interior through hole, comprising a non-through cup structure of the base unit;

the fixing unit being a hollow tube, having a protruding ear respectively at the position of each recess hole on the upper base cover, on each protruding ear being a through hole to match the screw hole of the recess hole;

the water resistant hood being shaped like a reversed hopper, having an outside diameter slightly larger than the outside diameter of the cover unit of the upper base cover, the bottom of the hood unit corresponding to each sunk hole on the upper base cover, the hood having a plurality of supporting posts that are vertically extended downward;

the top cover is shaped like a ring unit having a reversed-u section, on the bottom of its inner rim in the ring hole being a ringed groove having a bore to match the opening on top of the rotating unit;

the tree unit is shaped like a hollow cylinder, having a slightly retracted-bore at its lower section, serving to accommodate the rotating unit;

in the assembly of the above components, the upper base cover is used to cover the upper part of the main base unit, using a screw inserting in the through hole in each sunk hole on the upper base cover, inserted into the screw hole at the top of the fixing post on the main base unit to tightly join the two parts, then the rotating unit is inserted into the through hole on the upper base cover, so the outside gear on its bottom rim is in mesh with the transmission gear of the light-emitting transmission device, then the fixing unit is mounted outside the rotating unit, so each protruding ear is aligned with each recess hole on the upper base cover, using the screw to insert through the through hole on the protruding ear into the screw hole at the center of the recess hole, then the water resistant hood with its hollow hole is mounted outside the fixing unit, each supporting post on its bottom inserting into each sunk hole on the upper base cover, so the water resistant hood is fastened on an upper part of the upper base cover, and the top cover with its rings groove on its bottom rim is fastened to an opening at the top rim of the rotating unit, the tree unit can be directly installed inside the rotating unit to accommodate the fiber-optic Christmas tree.

\* \* \* \* \*